US012685964B1

(12) United States Patent
Bridges

(10) Patent No.: US 12,685,964 B1
(45) Date of Patent: Jul. 21, 2026

(54) ATMOSPHERIC CARBON DIOXIDE REMOVAL PROCESS

(71) Applicant: Rachel Bridges, Fort Worth, TX (US)

(72) Inventor: Rachel Bridges, Fort Worth, TX (US)

( * ) Notice: Subject to any disclaimer, the term of this patent is extended or adjusted under 35 U.S.C. 154(b) by 530 days.

(21) Appl. No.: 18/199,929

(22) Filed: May 20, 2023

(51) Int. Cl.
*B01D 53/62* (2006.01)
*B01D 53/73* (2006.01)

(52) U.S. Cl.
CPC ............. *B01D 53/62* (2013.01); *B01D 53/73* (2013.01); *B01D 2221/16* (2013.01); *B01D 2251/408* (2013.01); *B01D 2251/604* (2013.01); *B01D 2257/504* (2013.01); *B01D 2259/122* (2013.01); *B01D 2259/128* (2013.01)

(58) Field of Classification Search
CPC .... B01D 53/62; B01D 53/73; B01D 2221/16; B01D 2251/408; B01D 2251/604; B01D 2251/504; B01D 2259/122; B01D 2259/128; B01D 2257/504; B01D 2279/40; B01D 53/508; B01D 53/944; B01D 2258/01; B01D 2258/06; B01D 2257/80; B01D 53/90; B01D 53/1475; B01D 53/78; B01D 53/81; B01D 53/14; B01D 53/346; B01D 2255/2042; Y02C 20/40
USPC ......................................................... 55/421
See application file for complete search history.

(56) References Cited

U.S. PATENT DOCUMENTS

| | | | |
|---|---|---|---|
| 3,178,269 A | 4/1965 | McConnaughey | |
| 10,518,214 B2 | 12/2019 | Riley | |
| 10,561,983 B2 | 2/2020 | Escalettes et al. | |
| 10,864,480 B2 | 12/2020 | Riley | |
| 2003/0209140 A1 | 11/2003 | Kutt et al. | |
| 2005/0000531 A1* | 1/2005 | Shi ........................ | A24B 15/287 131/347 |
| 2008/0216653 A1 | 9/2008 | Paton-Ash et al. | |
| 2010/0108023 A1* | 5/2010 | McAlister .......... | F02M 21/0221 123/297 |
| 2011/0318231 A1 | 12/2011 | Hago et al. | |
| 2018/0369750 A1* | 12/2018 | Riley .................. | B01D 53/346 |

FOREIGN PATENT DOCUMENTS

| | | | | |
|---|---|---|---|---|
| CN | 110227408 A | * | 9/2019 | ........ B01J 20/28045 |
| CN | 112624172 A | * | 4/2021 | ............ C01F 11/188 |

* cited by examiner

*Primary Examiner* — Qianping He
(74) *Attorney, Agent, or Firm* — Cramer Patent & Design, PLLC.; Aaron R. Cramer

(57) ABSTRACT
The invention is a method for removing carbon dioxide gas from ambient air using water and solid barium hydroxide in a reaction vessel. Incoming and outgoing water is supplied by freshwater and wastewater treatment plants through underground piping. The reaction vessel has an upper part and a jacket, which is heated by hydrogen gas. The vessel has a series of discharge ports on the upper part, and a conversion facility is located in an area of high greenhouse gas concentration. The barium hydroxide reacts with carbon dioxide to produce barium carbonate, which is sold along with the discharge water to generate revenue. The method provides a promising solution for mitigating the effects of climate change by reducing carbon emissions from the atmosphere.

2 Claims, 4 Drawing Sheets

ATMOSPHERIC CARBON DIOXIDE REMOVAL PROCESS

RELATED APPLICATIONS

None.

FIELD OF THE INVENTION

The present invention relates to a process by which carbon dioxide is removed from the atmosphere.

BACKGROUND OF THE INVENTION

In recent years, the issue of climate change has become a major concern for governments, scientists, and individuals around the world. The rising levels of carbon dioxide (CO2) in the Earth's atmosphere have been identified as a key contributor to this phenomenon, leading to the development of various technologies aimed at reducing carbon emissions and capturing CO2 from the air.

One such technology is a process to remove carbon dioxide from the air. This process was initially developed as a means to combat climate change by removing excess CO2 from the atmosphere. The idea behind the technology is to capture CO2 from the air and store it in a secure location, such as underground geological formations or in chemical reactions.

However, the current process of removing CO2 from the air usually involves several complicated steps, including capturing the gas using specialized filters, compressing it into a liquid form, and storing it in secure underground reservoirs. Accordingly, there exists a need for a means by which CO2 can be removed from the air without the disadvantages as described above. The use of the atmospheric CO2 removal process accomplishes this task in a manner which is efficient and easy to perform.

SUMMARY OF THE INVENTION

To achieve the above and other objectives, the present invention provides for a method for removing carbon dioxide gas introducing a plurality of water into a reaction vessel, introducing a plurality of ambient air laden with a plurality of carbon dioxide into the reaction vessel, and introducing a plurality of solid barium hydroxide into the reaction vessel.

A plurality of incoming and outgoing water may be provided by a freshwater treatment plant and a wastewater treatment plant respectively via a plurality of underground piping. The reaction vessel may have an upper part and a jacket. The hydrogen gas may be used as fuel to heat the jacket of the reaction vessel. A series of discharge airports may be disposed on the upper part of the reaction vessel. The discharge airports may be present on the reaction vessel in a large industrial facility. A conversion facility may be located in an area of high greenhouse gas concentration.

The reaction vessel may be contained within is radius of 3,000 ft. of the conversion facility and within a height of over 700 ft. A plurality of calcium hydroxide may be introduced in lieu of the barium hydroxide into the reaction vessel. A plurality of barium may be introduced directly into the reaction vessel as the barium reacts readily with the water to form the barium hydroxide as well as a plurality of hydrogen gas. The water and the barium hydroxide may be aerated. The hydrogen gas may be sold to generate revenue. The barium hydroxide may react with the carbon dioxide to produce a plurality of barium carbonate. The barium hydroxide may react with the carbon dioxide to produce the barium carbonate.

The barium carbonate and a plurality of discharge water may be removed. The barium carbonate and the discharge water may be sold to generate revenue. The barium carbonate may be transported away from the conversion facility by outgoing one or more product trucks. The barium hydroxide may be transported to the conversion facility by one or more incoming raw material trucks. The method for removing carbon dioxide may remove up to 70,000,000,000,000 tons of carbon dioxide gas each year. The method for removing carbon dioxide gas may be controlled by a control system selected from the group consisting of a distributed control system, a supervisory control and data acquisition, or a programmable logic controller.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
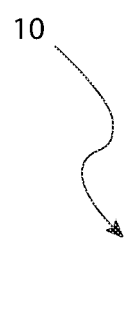
FIG. 1 is a process flow diagram of the atmospheric carbon dioxide (CO2) removal process, according to the preferred embodiment of the present invention.
Figure 1:
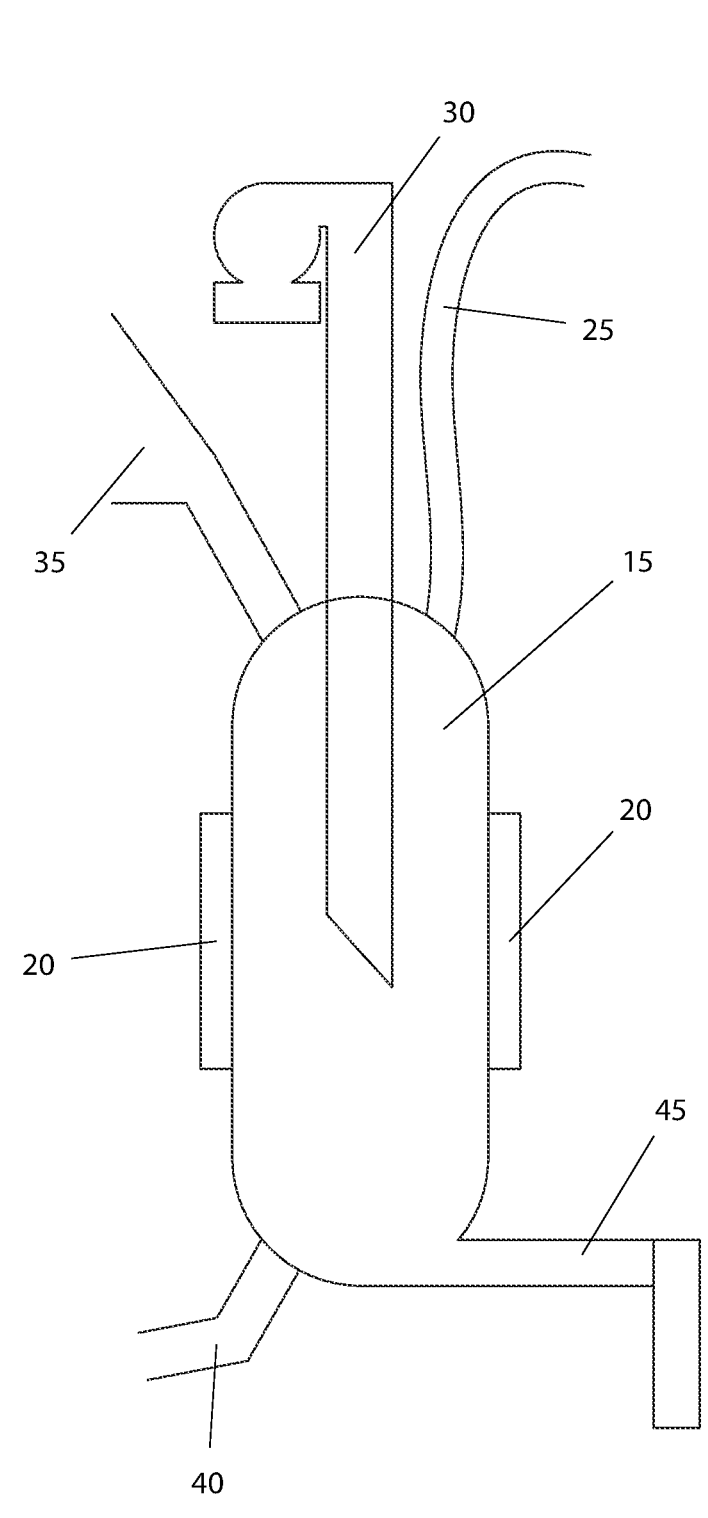

DESCRIPTIVE KEY 10 atmospheric carbon dioxide (CO2) removal process
15 reaction vessel
20 heated jacket
25 water (H2O)
30 incoming ambient air
35 barium hydroxide (Ba(OH)2)
40 barium carbonate (BaCO3)
45 discharge water (H2O)
50 discharge airport
55 conversion facility
60 air entrance housing
65 roof
70 exhaust vent
75 air flow
80 incoming raw material truck
85 outgoing product truck
90 vessel upper chamber
95 blower motor
100 injection syringe
105 water/barium hydroxide mixture
110 syringe travel path "s"
115 vessel lower chamber
120 lower chamber lid
125 sift
130 wastewater piping
135 solid exit
140 gate 145 control system
150 control console
155 sensor bank
160 ancillary input
165 output

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a process flow diagram of the atmospheric carbon dioxide (CO2) removal process 10, according to the preferred embodiment of the present invention is disclosed. The atmospheric carbon dioxide (CO2) removal process (herein also described as the "process") 10, provides for the large-scale removal of unwanted carbon dioxide (CO2) from the earth's atmosphere. The process 10 described herein below will allow for removal of up to seventy trillion tons (70,000,000,000,000 tons) of carbon dioxide (CO2) gas each year. The present invention can be scaled up and down to suit needs as required. Carbon dioxide (CO2), a greenhouse gas, is an unwanted byproduct generated by extraction and burning of fossil fuels (such as coal, oil, and natural gas), from wildfires, and from natural processes like volcanic eruptions. The process 10 comprises a two-part reaction vessel 15 with a heated jacket 20. Further details on the inner configuration of the reaction vessel 15 will be provided herein below.

The upper part of the reaction vessel 15 provides for the introduction of water (H2O) 25. Incoming ambient air 30, envisioned to be laden with carbon dioxide (CO2), a greenhouse gas, is introduced. Barium hydroxide (Ba(OH)2) 35 is also introduced as a solid. Other embodiments may feature the introduction of calcium hydroxide (Ca(OH)2) in lieu of the barium hydroxide, (Ba(OH)2). Additionally, it is envisioned that pure barium (Ba) could be introduced directly as barium (Ba) reacts readily with water (H2O) 25 to form barium hydroxide m (Ba(OH)2) as well as hydrogen gas (H2). In such an instance, the hydrogen (H2) could be used a fuel to heat the jacket 20 or sold to generate revenue. In any case, the direct or generated barium hydroxide (Ba(OH)2) 35 reacts with the carbon dioxide (CO2), to produce barium carbonate (BaCO3) 40 according to the following formula:
Ba (OH)2 (aq)+CO2 (g)→BaCO3 (s)+H2O (l)

The generated byproducts of barium carbonate (BaCO3) 40 and discharge water (H2O) 45 are removed and either discarded or sold to generate revenue. A series of discharge airports 50 are located on the top of the two-part reaction vessel 15.

Figure 2:
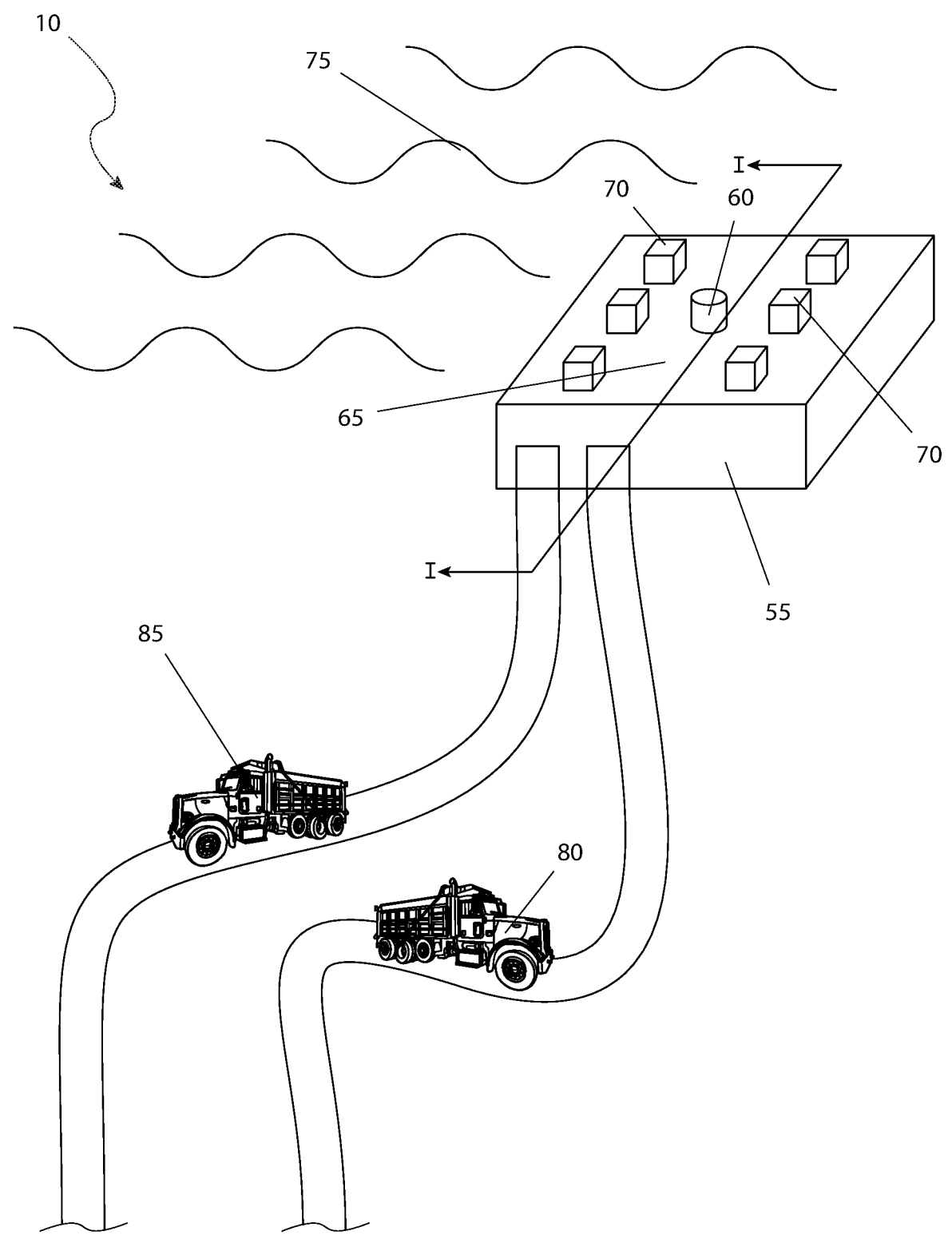
FIG. 2 is a conversion facility housing the atmospheric carbon dioxide (CO2) removal process, according to the preferred embodiment of the present invention.

Referring next to FIG. 2, a conversion facility 55 housing the process 10, according to the preferred embodiment of the present invention is depicted. The discharge airports 50 would be present in a large industrial facility. As the reaction vessel 15 contained within is very large (radius of approximately three-thousand feet (3,000 ft.) and a height of over seven hundred feet (700 ft.), the length of one (1) side of the conversion facility 55 can be over one mile (1 mi.) long. An air entrance housing 60 to allow for the entrance of the incoming ambient air 30 (as shown in FIG. 1) is located on the roof 65 of the conversion facility 55 a series of exhaust vents 70 are also located on the roof 65 and are envisioned to be in direct communication with the discharge airports 50 (as shown in FIG. 1). The incoming ambient air 30 and the discharge airports 50 will be accomplished via air flow 75 located near the conversion facility 55, thusly requiring said conversion facility 55 to be located in areas of high greenhouse gas concentrations. Incoming and outgoing water would be provided by freshwater treatment plants and wastewater treatment plants respectively, via underground piping. The remaining raw material, namely barium hydroxide 35 (Ba(OH)2; as shown in FIG. 1) would be transported to the conversion facility 55 by incoming raw material trucks 80. The generated by-product, namely barium carbonate 40 (BaCO3) would be transported away from the conversion facility 55 by outgoing product trucks 85.

Figure 3:
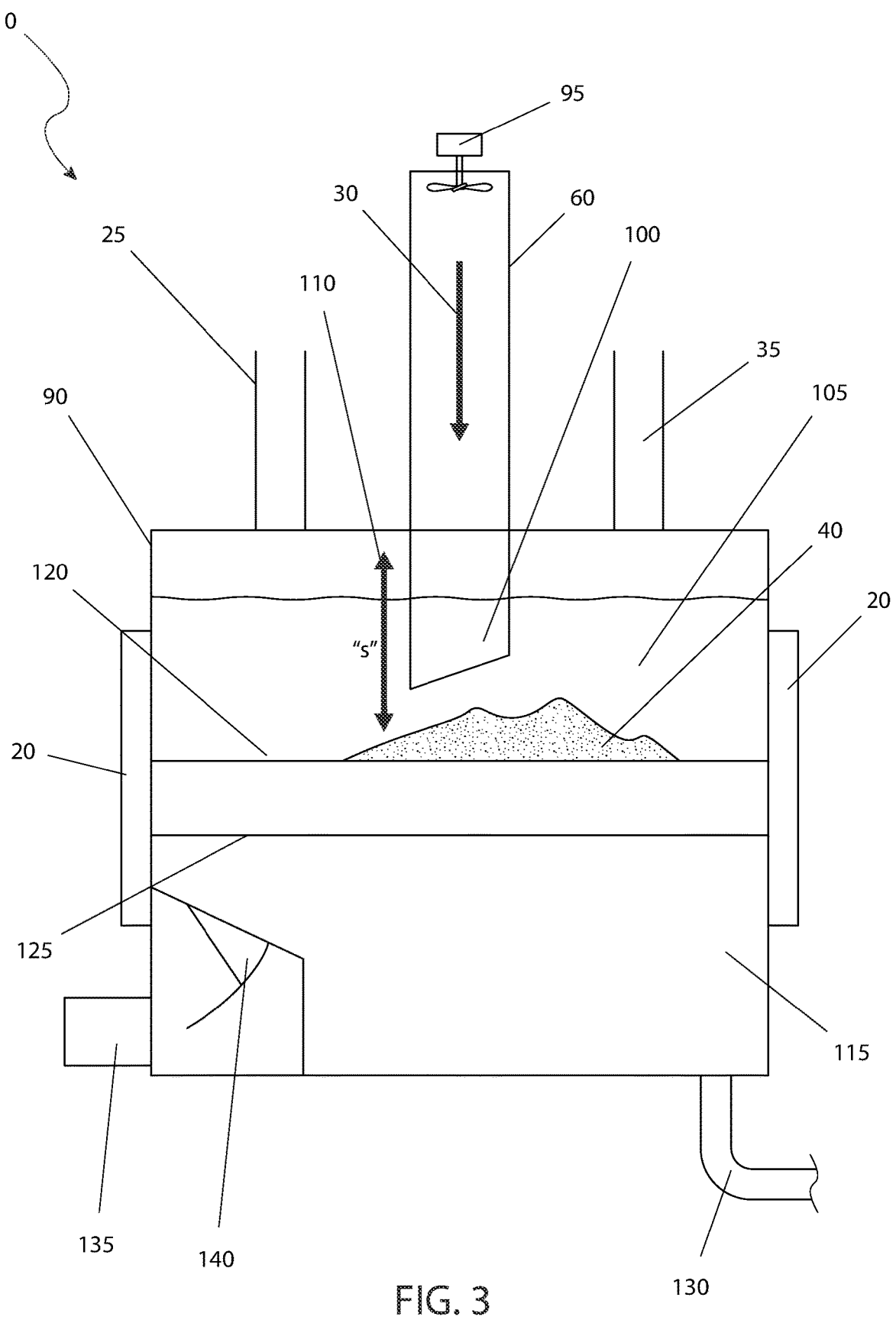
FIG. 3 is a sectional view of the atmospheric carbon dioxide (CO2) removal process, as seen along a Line I-I, as shown in FIG. 2, according to the preferred embodiment of the present invention.

Referring now to FIG. 3, a sectional view of the process 10, as seen along a Line I-I, as shown in FIG. 2, according to the preferred embodiment of the present invention is shown. The air entrance housing 60 is directed into the vessel upper chamber 90, envisioned to be two hundred twenty feet (220 ft.) tall and made of glass, via a blower motor 95 and into an injection syringe 100. The air entrance housing 60 then aerates the water/barium hydroxide (H2O)/Ba(OH)2 mixture 105. The water (H2O) 25 and the barium hydroxide (Ba(OH)2) 35 are injected via separate piping and ductwork respectively. The injection syringe 100 both extends and retracts into the vessel upper chamber 90 along a syringe travel path "s" 110 to allow for optimum aeration. Placement of the injection syringe 100 along the syringe travel path "s" 110 will depend on process conditions over time as the incoming ambient air 30 is absorbed by the barium hydroxide (Ba(OH)2) 35. Additionally, placement of the injection syringe 100 will depend on the amount of the water/barium hydroxide (H2O)/Ba(OH)2) mixture 105 within the vessel upper chamber 90. Syringe length also depends on the amount of product within the vessel upper chamber 90. This process generates the condition of "supersaturation" thus allowing the saturated solution of water/barium hydroxide (H2O)/Ba(OH)2) mixture 105 to generate barium carbonate (BaCO3) 40, along the syringe travel path "s" 110. The addition of incoming ambient air 30, over time, produces the barium carbonate (BaCO3) 40. This process continues until the barium hydroxide (Ba(OH)2) 35 is totally consumed.

A vessel lower chamber 115 is provided with a lower chamber lid 120. Once the above-mentioned super-saturation process is complete, the lower chamber lid 120 is opened to allow the barium carbonate (BaCO3) 40 and water (H2O) 25 to fall into the vessel lower chamber 115. A sift 125, envisioned to be a barrier with holes, will prevent passage of the barium carbonate (BaCO3) 40, while allowing the water (H2O) 25 to pass through. The water (H2O) 25 will become discharge water (H2O) 45 and leave via piping 130 to a treatment plant. The captured barium carbonate (BaCO3) 40 will continue to dry out with the aid of the heated jacket 20. Once fully dried and in a fluffed state, the sift 125 will open allowing the barium carbonate (BaCO3) 40 to fall into a solid exit 135 equipped with a gate 140. Subsequently, the barium carbonate (BaCO3) 40 is carried away via the outgoing product trucks 85 (as shown in FIG. 2) and sold to produce revenue.

Figure 4:
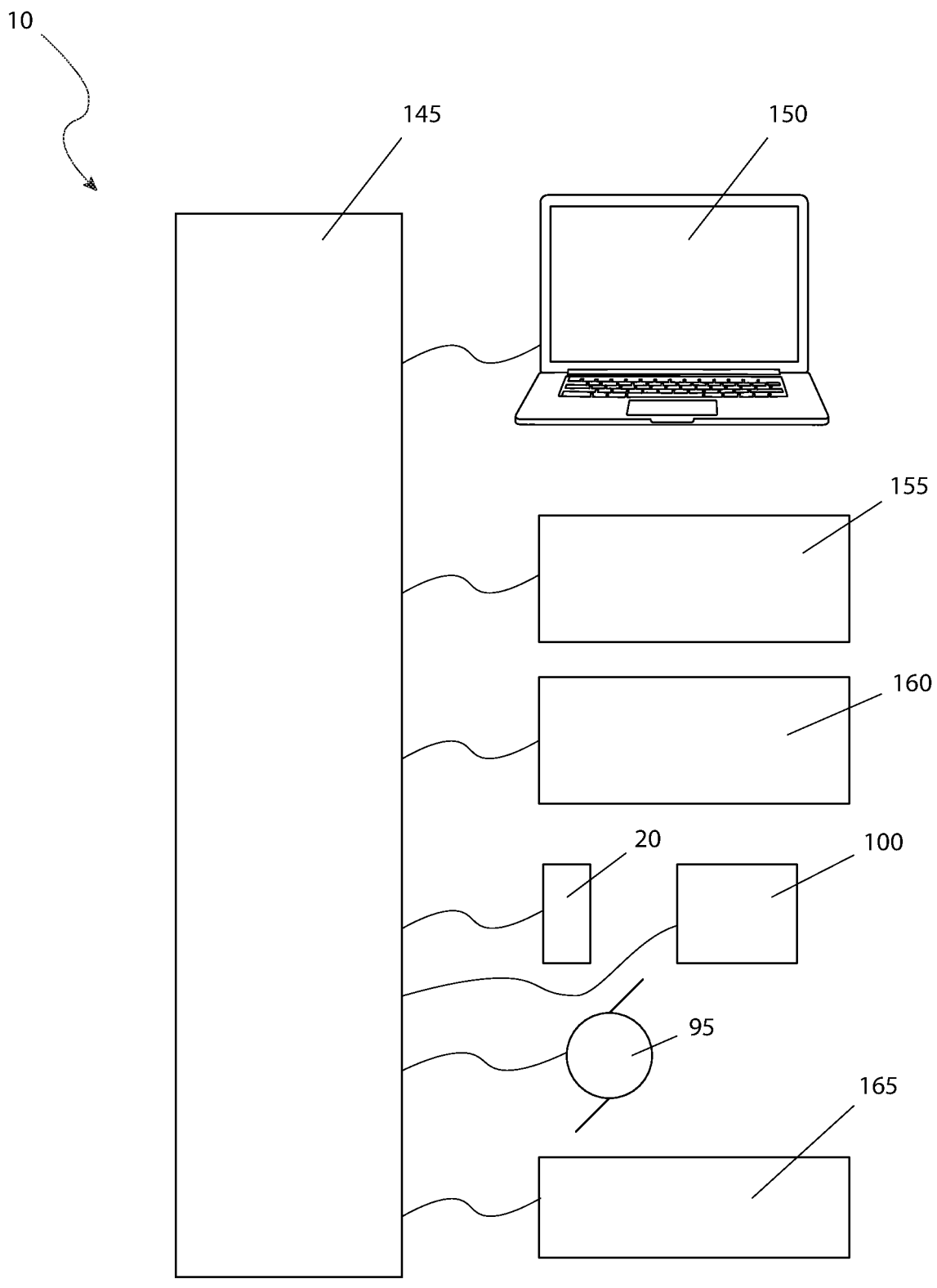
FIG. 4 is a control system diagram for the atmospheric carbon dioxide (CO2) removal process, according to the preferred embodiment of the present invention.

Referring to FIG. 4, a control system diagram for the process 10, according to the preferred embodiment of the present invention is disclosed. The process 10 is controlled by a control system 145 envisioned to be of the distributed control system (DCS) variety. Other systems such as supervisory control and data acquisition (SCADA) or programmable logic controller (PLC) may also be used with equal effectiveness. As such the use of any specific type of control system is not intended to be a limiting factor of the present invention. Various inputs to the control system 145 include a control console 150, a sensor bank 155 including temperature sensors, pressure sensors, flow sensors, level sensors, and the like. Ancillary inputs 160 such as valve limit switches, current sensors, and the like, also provide inputs to the control system 145. Similarly, the control system 145 provides output control to the heated jacket 20, the blower motor 95, the injection syringe 100, and other outputs 165 such as motors, valves, and the like.

2. Operation of the Preferred Embodiment

The preferred embodiment of the present invention can be utilized by the common user in a simple and effortless manner with little or no training. It is envisioned that the process 10 would be constructed in general accordance with FIG. 1 through FIG. 4. The process 10 would be built after careful studies and a site survey. Specific needs as an available site of suitable size, the presence of carbon dioxide (CO2) needing removal, transportation needs, availability of raw materials and the like.

After procurement and prior to utilization, the process 10 would be prepared in the following manner: the vessel upper chamber 90 would be filled with water (H2O) 25; the barium hydroxide (Ba(OH)2) 35 would be introduced into the water (H2O) 25 and mixed; additional barium hydroxide (Ba(OH)2) 35 would be added until the water/barium hydroxide (H2O)/Ba(OH)2) mixture 105 becomes supersaturated; the injection syringe 100 would be lowered into the water/ barium hydroxide (H2O)/Ba(OH)2) mixture 105; and, additional barium hydroxide (Ba(OH)2) 35 would be added until the desired level is reached. At this point in time, the process 10 is ready for utilization and operation.

During utilization of the process 10, the following procedure would be initiated: the blower motor 95 would be energized through the control system 145, causing incoming ambient air 30 to be introduced into the water/barium hydroxide (H2O)/Ba(OH)2) mixture 105 by the injection syringe 100; and over time, the reaction of the carbon dioxide (CO2) in the incoming ambient air 30 will react with the barium hydroxide (Ba(OH)2) 35 to produce barium carbonate (BaCO3) 40. Once the process is completed, the blower motor 95 is de-energized, the lower chamber lid 120 is opened, thereby allowing the water/barium hydroxide (H2O)/Ba(OH)2) mixture 105 to enter the vessel lower chamber 115, the sift 125 captures the barium carbonate (BaCO3) 40, allowing the water (H2O) 25 to become discharge water (H2O) 45 to fall through and out the wastewater piping 130, and the barium carbonate (BaCO3) 40 is then dried by the application of heat from the heated jacket 20. Once the barium carbonate (BaCO3) 40 is completely dried, the sift 125 will open allowing the barium carbonate (BaCO3) 40 to fall into the solid exit 135 and out through the gate 140, whereupon it is removed by outgoing product trucks 85 and sold to produce revenue.

After completion of one (1) batch cycle of the process 10, it is repeated for continuous operation in a cyclical manner. It is appreciated the usage of calcium hydroxide (Ca(OH)2) in lieu of the barium hydroxide, (Ba(OH)2) also falls under the overall scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method for removing carbon dioxide from ambient air, the method comprising:

providing a reaction vessel including an upper chamber and a lower chamber, the lower chamber including a lid movable between a closed position and an open position;

introducing water and solid barium hydroxide into the upper chamber and mixing the water and solid barium hydroxide to form a supersaturated aqueous hydroxide mixture;

introducing incoming ambient air into the supersaturated aqueous hydroxide mixture using an injection syringe operatively coupled to a blower motor;

wherein the injection syringe is configured to extend and retract along a defined travel path within the upper chamber to aerate the supersaturated aqueous hydroxide mixture;

reacting the carbon dioxide from the incoming ambient air with the supersaturated aqueous hydroxide mixture to form barium carbonate within the upper chamber;

opening the lid of the lower chamber to permit transfer of contents from the upper chamber into the lower chamber;

separating, within the lower chamber, water from the barium carbonate using a sift;

wherein the sift permits passage of the water while retaining the barium carbonate;

routing the separated water from the lower chamber into wastewater piping;

drying the retained barium carbonate within the lower chamber using a heated jacket associated with the reaction vessel; and, after drying, opening the sift to release the barium carbonate into a solid exit having a gate for controlled removal of the barium carbonate from the reaction vessel.

2. The method of claim 1, further comprising operating a control system configured to:

control the blower motor to introduce the incoming ambient air to the injection syringe;

control the extension and retraction of the injection syringe along the defined travel path during the aeration of the supersaturated aqueous hydroxide mixture; and, control application of heat to the heated jacket during the drying of the barium carbonate.

* * * * *